United States Patent
Murakami et al.

(10) Patent No.: US 12,476,563 B2
(45) Date of Patent: Nov. 18, 2025

(54) POWER SYSTEM AND CONTROL METHOD OF POWER SYSTEM

(71) Applicant: Hitachi-GE Nuclear Energy, Ltd., Hitachi (JP)

(72) Inventors: Yohei Murakami, Tokyo (JP); Masahiro Watanabe, Tokyo (JP)

(73) Assignee: Hitachi GE-Nuclear Energy, Ltd., Hitachi (JP)

( * ) Notice: Subject to any disclaimer, the term of this patent is extended or adjusted under 35 U.S.C. 154(b) by 0 days.

(21) Appl. No.: 18/959,995

(22) Filed: Nov. 26, 2024

(65) Prior Publication Data
US 2025/0202389 A1 Jun. 19, 2025

(51) Int. Cl.
  *H02P 9/00* (2006.01)
  *H02P 9/10* (2006.01)
  *H02P 101/20* (2015.01)

(52) U.S. Cl.
  CPC .............. *H02P 9/107* (2013.01); *H02P 9/105* (2013.01); *H02P 2101/20* (2015.01)

(58) Field of Classification Search
  CPC ...... H02P 9/107; H02P 9/105; H02P 2101/20; F01K 11/02; G21D 3/00
  See application file for complete search history.

(56) References Cited

U.S. PATENT DOCUMENTS

2023/0155383 A1* 5/2023 Metcalfe ................... H02J 3/18
                                                        323/215

FOREIGN PATENT DOCUMENTS

| CN | 105552916 A | | 5/2016 |
|---|---|---|---|
| CN | 104330616 B | * | 6/2017 |
| JP | 2014228384 A | * | 12/2014 |
| JP | 2023-023185 A | | 2/2023 |
| WO | WO 2023/188384 A1 | | 10/2023 |

OTHER PUBLICATIONS

Kurachi M., "Terminology Lecture 32nd Theme: Reactive Power Compensator (STATCOM)", The Institute of Electrical Engineers of Japan, Aug. 25, 2020 with English translation (4 pages).
Extended European Search Report issued in European Application No. 24214286.7 dated Apr. 28, 2025 (8 pages).
Sirvastava, M. et al., "Controlling Transmission Line Power Parameters by Using UPFC", 2021 Asian Conference on Innovation in Technology (ASIANCON), Aug. 27, 2021, pp. 1-6, IEEE, XP033980867 (6 pages).

* cited by examiner

*Primary Examiner* — Julio C. Gonzalez
(74) *Attorney, Agent, or Firm* — Crowell & Moring LLP

(57) ABSTRACT

A power system, which can appropriately control an output power of a power plant, includes a power plant, a power transmission flow limiter inserted between the power plant and a substation via transmission lines and, and a control system, wherein the control system outputs to the power transmission flow limiter a power transmission flow limitation signal CP indicating that an output power P of the power plant should be limited; and the power transmission flow limiter limits the output power P of the power plant, which is transmitted via the transmission lines and on the basis of the power transmission flow limitation signal CP.

7 Claims, 11 Drawing Sheets

POWER SYSTEM AND CONTROL METHOD OF POWER SYSTEM

INCORPORATION BY REFERENCE

The present invention relates to and asserts priority from Japanese patent application No. 2023-212105 filed on Dec. 15, 2023, and incorporates the entirety of the contents and subject matter of all the above application herein by reference.

TECHNICAL FIELD

This invention relates to a power system and a control method of the power system.

BACKGROUND ART

Renewable energies are being introduced globally in order to achieve a decarbonized society, but the power grids to which renewable energies are connected are predicted to face various challenges, including supply-demand balance, excess transmission capacity, voltage fluctuations, frequency fluctuations, and stability. This is due to the fact that the optimal locations for introducing variable renewable energies such as solar and wind power are unevenly distributed, resulting in increase in the power transmission flow from a generation area to a demand area and frequent occurrences of overloads at local transmission lines.

To address this type of problem, for example, the abstract of Patent Literature 1 below discloses "A system stabilizer comprises: a system data creation part 103 that creates system data based on collected information on a power grid; a basic electric control device selection part 104 that selects an object power generator of power supply limitation for maintaining stability of the power grid on the basis of predetermined rules; a frequency model creation part 105 that creates a standard frequency model obtained by simulating a reaction of a frequency in the power grid under a condition that the predetermined time passes from the power supply limitation; a frequency stability determination part 106 that determines frequency stability by using the created model; an electric power control device object change part 107 that changes the object power generator of the power supply limitation selected by the basic electric control device selection part on the basis of a determination result; a storage part 101 that stores the determined electric control device change information; and a control signal transmission part 108 that transmits, when a system accident occurs, a control signal to the object power generator of the power supply limitation indicated by the electric control device change information." In addition, the non-patent literature 1 describes the technology related to a static synchronous compensator (STATCOM, self-excited reactive power compensator). The descriptions in these documents are included as part of this specification.

CITATION LIST

Patent Literature

[PTL 1]
Patent Application Publication No. JP2023-023185

Non Patent Literature

[NPL 1]
Masahide Kurachi, "Glossary 32nd Theme: Reactive Power Compensator (STATCOM)," The Institute of Electrical Engineers of Japan [online], [retrieved Nov. 15, 2023], [URL: https://www.iee.jp/pes/termb_032/]

SUMMARY OF INVENTION

Technical Problem

In the above-mentioned technologies, there is a need to control output power of a power plant more appropriately.

The purpose of the present invention is to provide a power system and a control method of a power system that is able to appropriately control the output power of the power plant in view of the circumstances described above.

Solution to Problem

To solve the above problem, a power system of the present invention includes: a power plant provided with a steam condenser, a turbine, a steam generator, a turbine bypass valve that distributes steam generated by the steam generator to the steam condenser and the turbine, and a generator driven by the turbine; a power transmission flow limiter inserted between the power plant and a substation via a transmission line; and a control system, wherein the control system outputs to the power transmission flow limiter a power transmission flow limitation signal indicating that the output power of the power plant should be limited; and the power transmission flow limiter limits the output power from the power plant that is transmitted via the transmission line on the basis of the power transmission flow limitation signal.

Advantageous Effects of Invention

According to the present invention, the output power of the power plant is able to be properly regulated.

DESCRIPTION OF EMBODIMENTS

Prerequisite of Implementation

First, technology that is prerequisite for each embodiment is explained.

Figure 1:
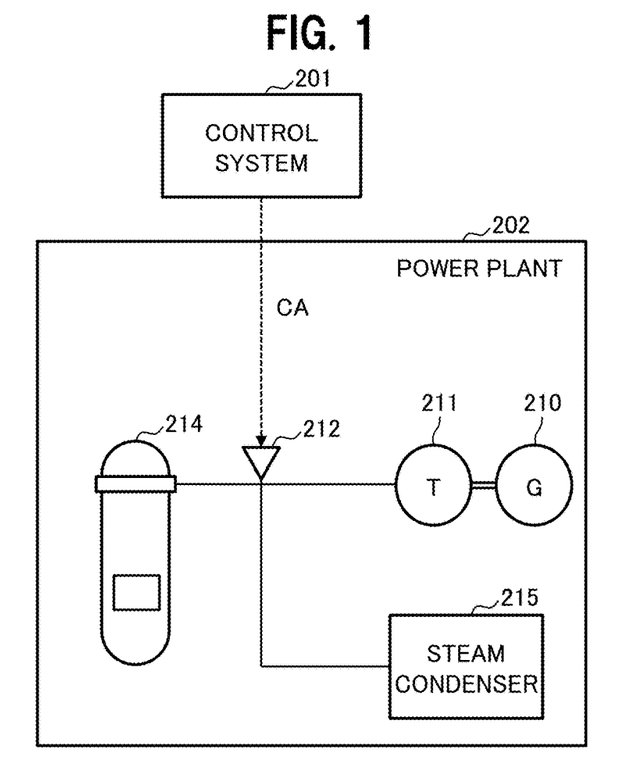
FIG. 1 is a schematic diagram showing a configuration of a power plant in a comparative example.

FIG. 1 is a schematic diagram showing a configuration of a power plant 202 in a comparative example.

The power plant 202 is, for example, a thermal power plant and includes a generator 210, a turbine 211, a turbine bypass valve 212, a boiler 214, and a steam condenser 215. The boiler 214 generates steam, and the generated steam is supplied through the turbine bypass valve 212 to the turbine 211 to rotate the turbine 211. The generator 210 is directly connected to the turbine 211 and rotates with it.

The power plant 202 may receive a turbine bypass regulation signal CA from a control system 201, which is, for example, a central power supply command station. Upon receipt of the turbine bypass regulation signal CA, the power plant 202 controls the opening of the turbine bypass valve 212 to limit the amount of steam flowing to the turbine 211. This allows limiting the amount of steam sent from the boiler 214 to the turbine 211 and limited amount of steam is sent to the steam condenser 215. As a result of limiting the amount of steam to the turbine 211, the output power from the generator 210 is limited.

Figure 2:
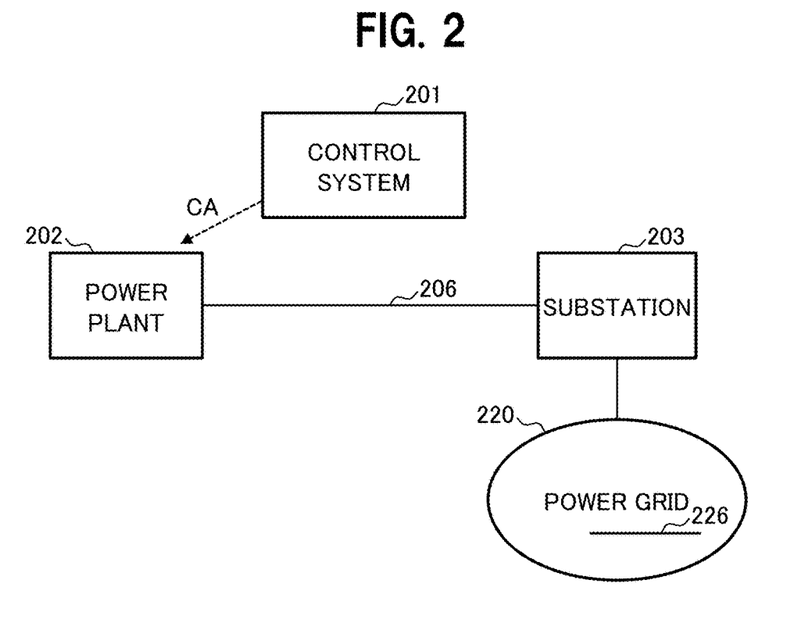
FIG. 2: is a diagram showing a linkage between the power plant and an external grid in the comparative example.

FIG. 2: is a diagram showing a linkage between the power plant and an external grid in a comparative example.

In FIG. 2, the power plant 202 is connected to a substation 203 via a transmission line 206. Further, the substation 203 is connected to a power grid 220. For example, when a transmission line 226 included in the power grid 220 is disconnected, it becomes necessary to eliminate a local overload of the power grid 220 by controlling the power flow in the power grid 220. In such a case, as described above, the control system 201 sends a turbine bypass regulation signal CA to the power plant 202 to limit the output power of the generator 210 (see FIG. 1). As a result, the power transmission flow sent to the substation 203 through the transmission line 206 is limited.

Figure 3:
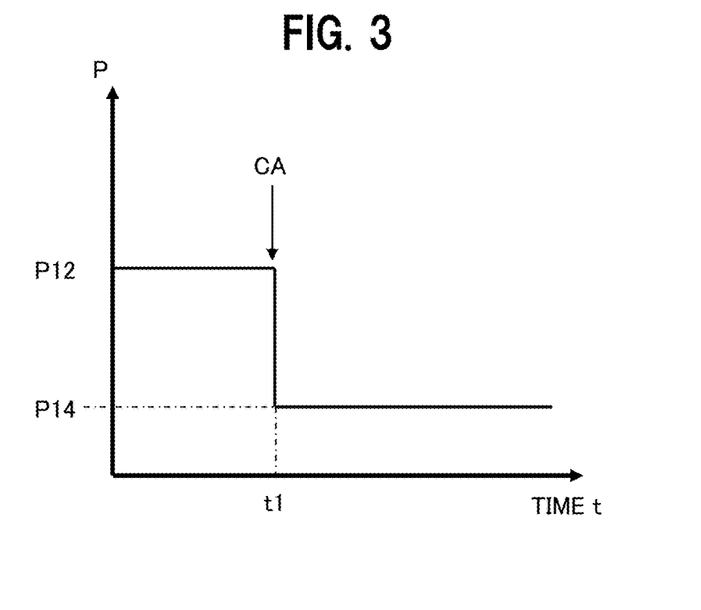
FIG. 3 is a diagram showing an example of an output power of a generator in the comparative example.

FIG. 3 is a diagram showing an example of the output power P of the generator 210 in a comparative example. Note that the output power P is an effective power outputted by the generator 210.

Assume that at time t1, the turbine bypass regulation signal CA is provided to the power plant 202. The output power P is indicated by P12 before the turbine bypass regulation signal CA is provided and lowered to P14 after providing the turbine bypass regulation signal CA.

Returning to FIG. 1, as mentioned above, when the power plant 202 is a thermal power plant, the turbine bypass valve 212 is able to be regulated according to the turbine bypass regulation signal CA. This allows the output of the generator 210 to be limited, and thereby improving the system stability in an event of a system failure in the power grid 220. However, there is a problem when the power plant 202 is a nuclear power plant the power plant 202 is not able to receive a signal such as the turbine bypass regulation signal CA from the control system 201 to change an operation pattern of the power plant 202. This is because in a nuclear power plant, a control sequence is configured so that an operation of the generator 210 is determined solely within the power plant in order to prevent a disturbance from an external area that could cause an abnormality in an operation of a nuclear reactor.

An alternative means for rejecting the signal from the control system 201 is considered to disconnect the generator from the grid on the grid side. It means that the power plant 202 is considered to be disconnected from the transmission line 206 (see FIG. 2). However, in the nuclear power plants, when power limitation is performed, control rods are inserted into a reactor, which causes several weeks to be taken before a normal operation resumes thereafter (after the power limitation is lifted).

Therefore, in the embodiments described below, the power output of the generator is regulated by operating the turbine bypass valve without direct input/output of signals from the control system 201. The specific configuration is described below, but in each embodiment, a power transmission flow limiter is provided between a power plant and a substation, and the power transmission flow through the transmission line is limited by a signal from the control system 201. The power plant passively opens and closes the turbine bypass valves in the power plant in response to the limitation of the power transmission flow. This allows the power output of the generator to be regulated by regulating the turbine bypass valve of the generator without communicating direct signal input/output with the control system 201.

First Embodiment

Configuration of First Embodiment

Figure 4:
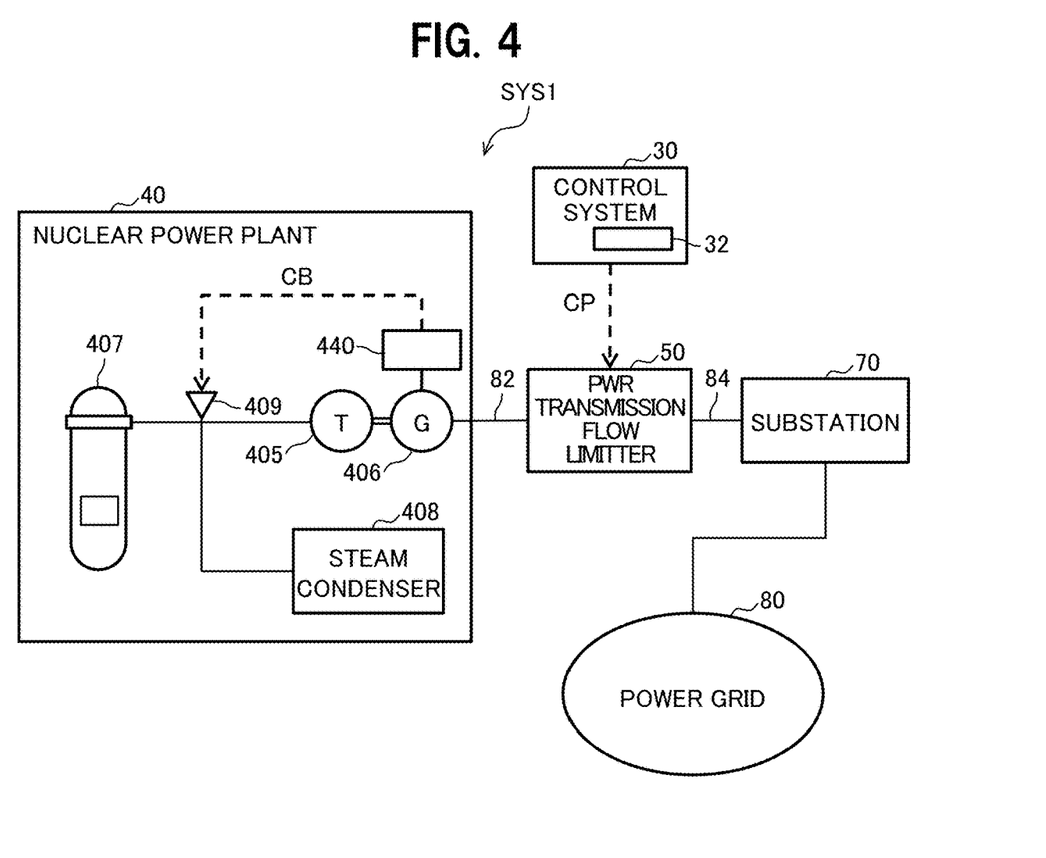
FIG. 4 is a block diagram of a power system according to a first embodiment.

FIG. 4 shows a block diagram of a power system SYS1 according to the first embodiment.

In FIG. 4, the power system SYS1 includes a nuclear power plant 40 (power plant), a substation 70, a power transmission flow limiter 50, transmission lines 82 and 84, and a control system 30. The transmission line 82 connects the nuclear power plant 40 to the power transmission flow limiter 50, and the transmission line 84 connects the power transmission flow limiter 50 to the substation 70.

In addition, the substation is connected to the power grid 80. Specific examples of configurations of the power transmission flow limiter 50 are described in other embodiments described below (see FIGS. 12 to 14). The power transmission flow limiter 50 is a device that equivalently inserts a capacitor or other element into the power lines 82 and 84, or disconnects the power lines 82 and 84 in an event of a grid failure. The control system 30 includes a plant controller 32.

The plant controller 32 manages operational statuses of the generators in power plants including other power plants such as thermal, nuclear, or other type power plants (not shown) as well as the nuclear power plant 40. The plant controller 32 is equipped with a computer 980 described below (see FIG. 5) and implements various functions by executing an unshown control program.

The control system 30 is, for example, a central power supply command station and may be installed in the substation 70 or other places. The control system 30 has a function of outputting a generator output regulation signal and an operation instruction of a protective relay to other thermal power plants (not shown) and other substations (not shown) in an event of a failure of the power grid 80. The control system 30 then sends the power transmission flow limitation signal CP to the power transmission flow limiter 50, which includes a command to perform limitation of the output power P of the nuclear power plant 40 and a limitation amount of the power transmission flow, in a case in which the output power P of the nuclear power plant 40, i.e., the power transmission flow should be limited.

The nuclear power plant 40 includes a turbine 405, a generator 406, a reactor 407 (steam generator), a steam condenser 408, a turbine bypass valve 409, and a bypass opening degree control device 440. The reactor 407 generates steam, and the generated steam is supplied to the turbine 405 through the turbine bypass valve 409 to rotate the turbine 405. The generator 406 is directly connected to the turbine 405 and rotates with the turbine 405.

The bypass opening degree control device 440 monitors a condition of the generator 406, including an output voltage, output current, frequency, and the like of the generator 406, and then regulates the turbine bypass regulation signal CB according to the monitoring results, and thereby controls the opening degree of the turbine bypass valve 409. In other words, the bypass opening degree control device 440 controls the opening degree of the turbine bypass valve 409 so as to limit the amount of steam supplied to the turbine 405. As a result, the amount of steam from the reactor 407 supplied to the turbine 405 is limited, and the limited steam is sent to the steam condenser 408. The limitation of the steam amount to the turbine 405 results in limiting the output power P, which is an effective power outputted by the generator 406.

When the control system 30 outputs the power transmission flow limitation signal CP to the power transmission flow limiter 50, a state of the power transmission flow limiter 50 appears to change when seen from the nuclear power plant 40. As a result, a rotation speed of the generator 406 increases and the output voltage also increases. In response to this change in the state of the generator 406, the bypass opening degree controller 440 outputs the turbine bypass regulation signal CB to the turbine bypass valve 409 to limit the steam amount to the turbine 405.

Figure 5:
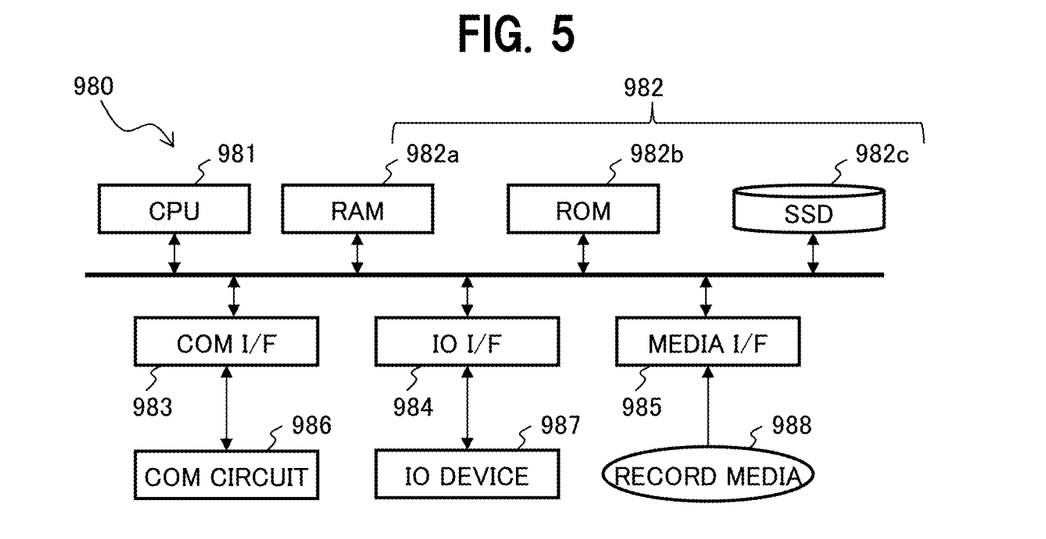
FIG. 5 is a block diagram of a computer.

FIG. 5 is a block diagram of the computer 980. The plant controller 32 and the bypass opening degree control device 440 shown in FIG. 4 are both equipped with one or more of the computers 980 shown in FIG. 5.

In FIG. 5, the computer 980 is equipped with a CPU 981, a memory unit 982, a communication interface 983, an I/O interface 984, and a media interface 985. The memory unit 982 includes RAM 982a, ROM 982b, and SSD (Solid State Drive) 982c. The communication I/F 983 is connected to the communication circuit 986. The I/O I/F 984 is connected to the I/O device 987. The media I/F 985 reads and writes data from/to a recording media 988. The ROM 982b stores an IPL (Initial Program Loader), and the like, which is executed by the CPU. The SSD 982c stores a control program, various data, and the like. The CPU 981 performs various functions by executing the control program and the like that is read from the SSD 982c into the RAM 982a.

Figure 6:
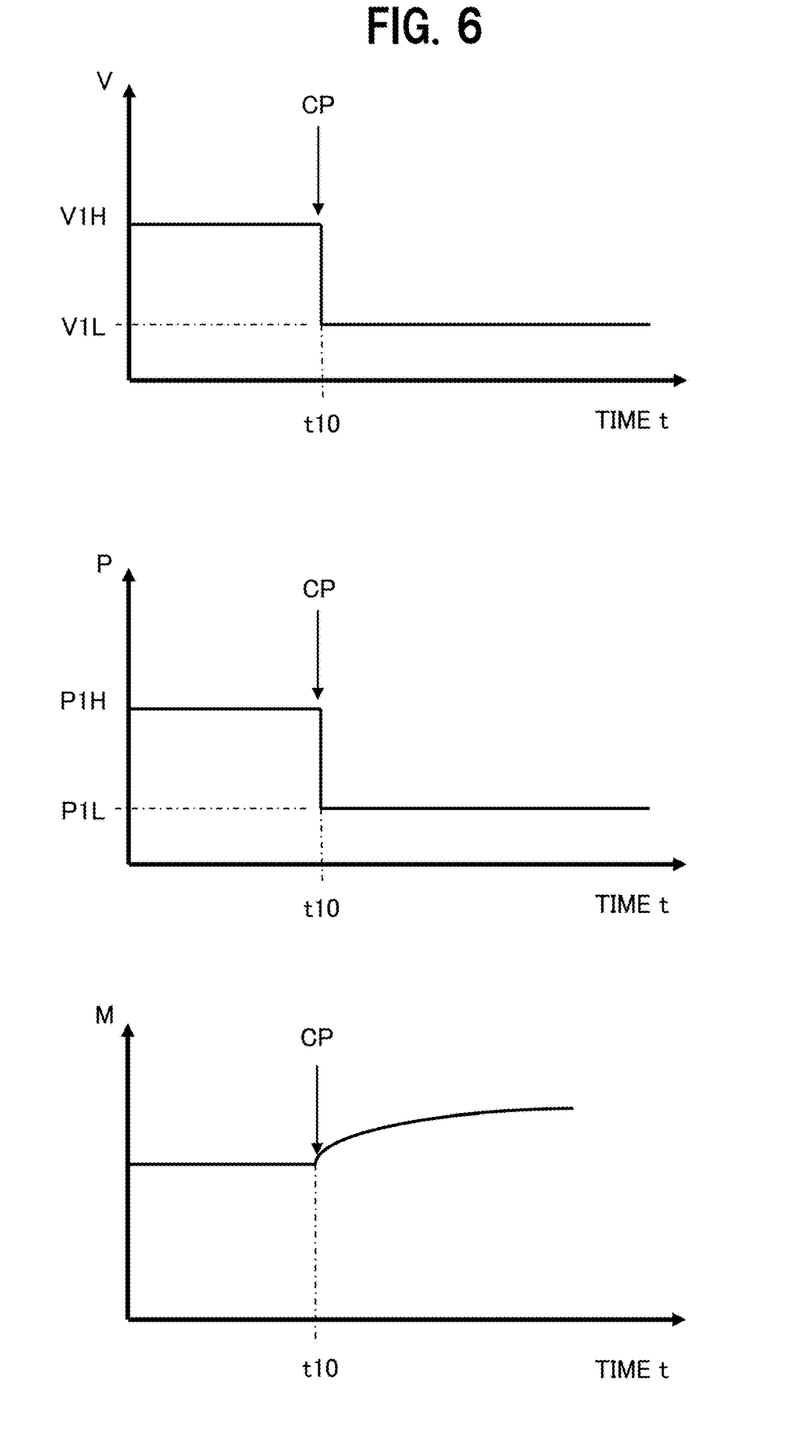
FIG. 6 is a diagram showing an example of a transmission line voltage, an output power, and a rotation speed in the first embodiment.

FIG. 6 is a diagram showing an example of a transmission line voltage V, an output power P, and a rotation speed M in the first embodiment.

Hereinbelow, referring to FIG. 6, a principle of the power transmission flow limitation in the first embodiment is explained.

The transmission line voltage V is a voltage of the transmission line 82 and is equal to an output voltage of the generator 406. The output power P is the effective power outputted from the generator 406 through the transmission line 82. The rotation speed M is a rotation speed of the generator 406. Before time t10, the transmission line voltage V is a voltage V1H. At time t10, when the plant controller 32 outputs the power transmission flow limitation signal CP (see FIG. 4), the power transmission flow limiter 50 sets the transmission line voltage V to be a voltage V1L, which is a value below a predetermined voltage class, on the basis of the power transmission flow limitation signal CP. For this purpose, the power transmission flow limiter 50 is preferably provided with a reactance such as an inductor, capacitor, and the like An upper limit is set for the output power P that is outputted via the transmission line 82, in view of a thermal capacity of the transmission line 82 and the synchronization stability. For example, the power P1H shown in the figure is one of the above upper limits. When the power transmission flow limiter 50 receives the power transmission flow limitation signal CP at time t10, it lowers an upper limit value of the output power P. The command for this lowered upper limit value is included in the power transmission flow limitation signal CP. The lowered upper limit value is, for example, the power P1L shown in the FIG. 6. The change in the upper limit value of output power P is achieved by lowering the transmission line voltage V after the system failure from the voltage V1L before the system failure. The specific facilities for the transmission line flow and a method for setting the upper limit are explained in detail in other embodiments (see FIGS. 12 through 14) described below.

The rotation speed M is kept at a predetermined standard speed M1L before time t10. At time t10, the power that can no longer be transmitted from the generator 406 to the substation 70 due to the output power P being changed to the power P1L is spent to accelerate the generator 406. As a result, after time t10 when the power transmission flow limiter 50 receives the power transmission flow limitation signal CP, the rotation speed M of the generator 406 gradually increases from the standard speed M1L. When the bypass opening degree control device 440 detects the above-mentioned change in the state of the generator 406, the bypass opening degree control device 440 regulates the turbine bypass regulation signal CB supplied to the turbine bypass valve 409.

Figure 7:
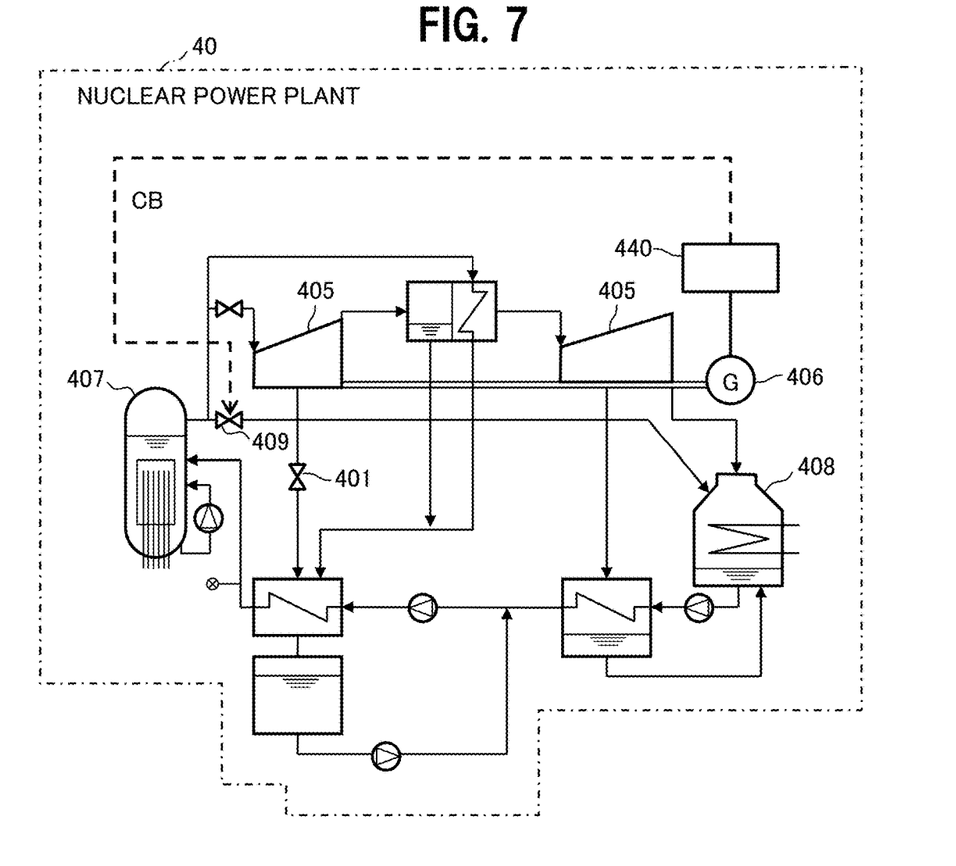
FIG. 7 is a schematic block diagram of a nuclear power plant in the first embodiment.

FIG. 7 is a schematic block diagram of a nuclear power plant 40 in the first embodiment.

FIG. 7 illustrates a principle of power regulation through operation of the turbine bypass valve 409.

As shown above in FIG. 4, the nuclear power plant 40 is equipped with the reactor 407, the turbine bypass valve 409, the turbine 405, the generator 406, and the steam condenser 408. In addition, the nuclear power plant 40 is equipped with a bleed air valve 401. The steam generated from the reactor 407 is split by the turbine bypass valve 409 into two parts: one that passes through the turbine 405 and then flows into the steam condenser 408, and one that flows directly into the steam condenser 408. This FIG. 7 shows as an example the nuclear power plant 40 equipped with a boiling water reactor 407, but the same can be applied to a nuclear power plant 40 in which the reactor 407 is a pressurized water reactor.

The bypass opening degree control device 440 includes a control logic that automatically controls the turbine bypass valve 409 so that the rotational speed M of the generator 406 approaches (preferably matches) the standard speed M1L (see FIG. 6). Therefore, when the rotational speed M becomes higher than the standard speed M1L, as after the time t10 in FIG. 6, the bypass opening degree control device 440 controls the turbine bypass valve 409 to reduce the amount of steam entering the turbine 405.

Figure 8:
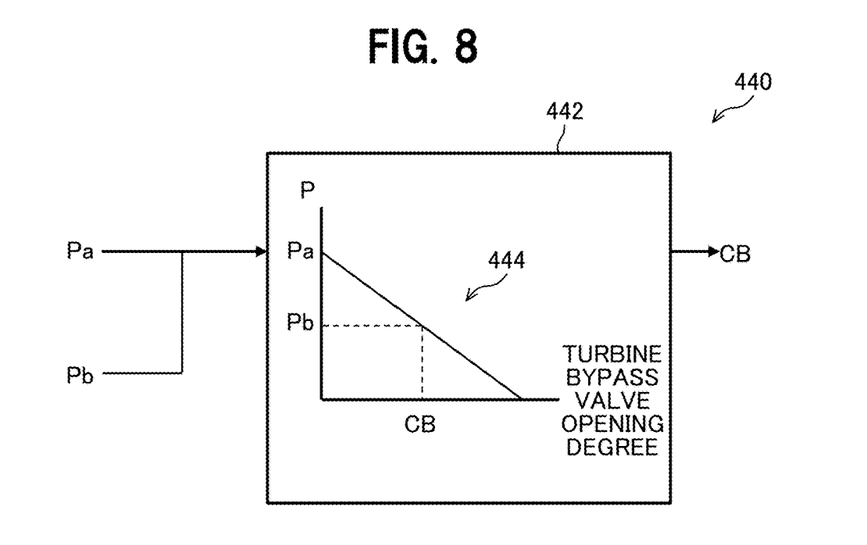
FIG. 8 is a block diagram of a bypass opening degree control device.

FIG. 8 is a block diagram of a bypass opening degree control device 440.

The bypass opening degree control device 440 is equipped with a turbine bypass valve opening degree calculation unit 442. The bypass opening degree control device 440 determines the opening degree of the turbine bypass valve 409 according to the output power of the generator 406. The present output power Pa of the generator 406 and the target output power Pb are inputted to the turbine bypass valve opening degree calculation unit 442. Here, the output power Pa is, for example, the output power P shown in FIG. 6, and the target output power Pb is, for example, the power P1H shown in FIG. 6.

The turbine bypass valve opening degree calculation unit 442 has a table 444 that defines a relationship between the output power Pa, the target output power Pb, and the turbine bypass regulation signal CB. The turbine bypass valve opening degree calculation unit 442 uses this table 444 to determine the opening degree of the turbine bypass valve 409 that achieves the target output power Pb, and outputs the turbine bypass regulation signal CB that specifies the determined opening degree.

Figure 9:
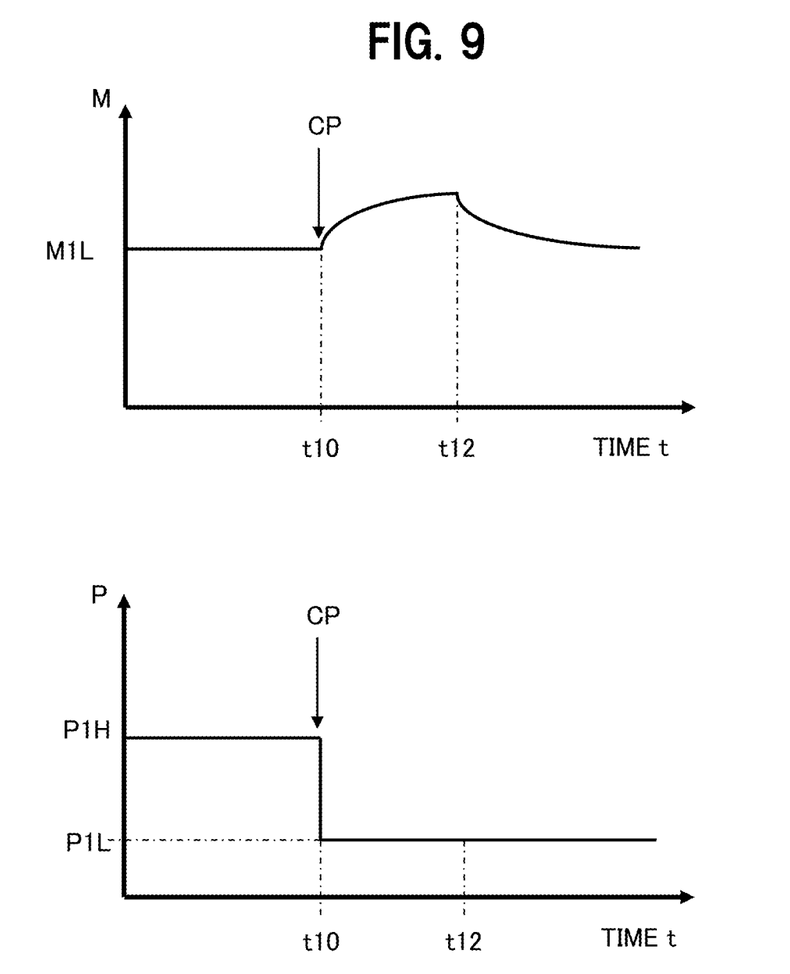
FIG. 9 is a diagram showing an example of a rotational speed and an output power in the first embodiment.

FIG. 9 is a diagram showing an example of the rotational speed M and the output power P in the first embodiment.

FIG. 9 shows an example of the rotation speed M and the output power P when the power transmission flow limitation signal CP is received from the control system 30. Suppose that at the time t10, the power transmission flow limitation signal CP is outputted from the control system 30 to the power transmission flow limiter 50. As a result, the output power P outputted by the generator 406 drops from P1H to P1L at time t10, as explained above about FIG. 6. In addition, the rotation speed M is gradually increased from time t10, although it is the standard speed M1L before time t10.

Due to dropping of the output power P from the power P1H to the power P1L, the bypass opening degree control device 440 changes the turbine bypass regulation signal CB at time t12. In other words, the turbine bypass valve 409 (see FIG. 7) is controlled to increase the amount of steam flowing to the steam condenser 408 without going through the turbine 405. As a result, after time t12, the rotation speed M gradually returns to the standard speed M1L, and is then maintained at the standard speed M1L. Meanwhile, the output power P is kept at the power P1L after time t10.

The above described algorithm allows the nuclear power plant 40 to limit the output power P outputted from the generator 406 without directly receiving the power transmission flow limitation signal CP from the control system 30. In other words, the nuclear power plant 40 is able to passively limit the output power P of the generator 406 by reflecting that the power transmission flow limiter 50 receives the power transmission flow limitation signal CP from the control system 30 and the upper limit of the output power P is set.

Second Embodiment

Next is a description of the power system according to the second embodiment.

The overall configuration of the power system according to the second embodiment is the same as that of the first embodiment (see FIG. 4). In the following explanation, components corresponding to those of the first embodiment described above are marked with the same reference signs, and their descriptions may be omitted.

Similar to the first embodiment described above, in this second embodiment, the control system 30 sends the power transmission flow limitation signal CP to the power transmission flow limiter 50, as necessary. Here, it is considered more preferable to determine necessity of outputting the power transmission flow limitation signal CP and an upper limit of the power transmission flow to be limited in view of system stability level of the power grid 80 when the power transmission flow limitation signal CP is outputted. This is expected to make it more effective for improving the system stability to provide the power transmission flow limitation signal CP to the power transmission flow limiter 50. Therefore, in this embodiment, a screen shown in FIG. 10 is displayed in the plant controller 32 equipped in the control system 30.

Figure 10:
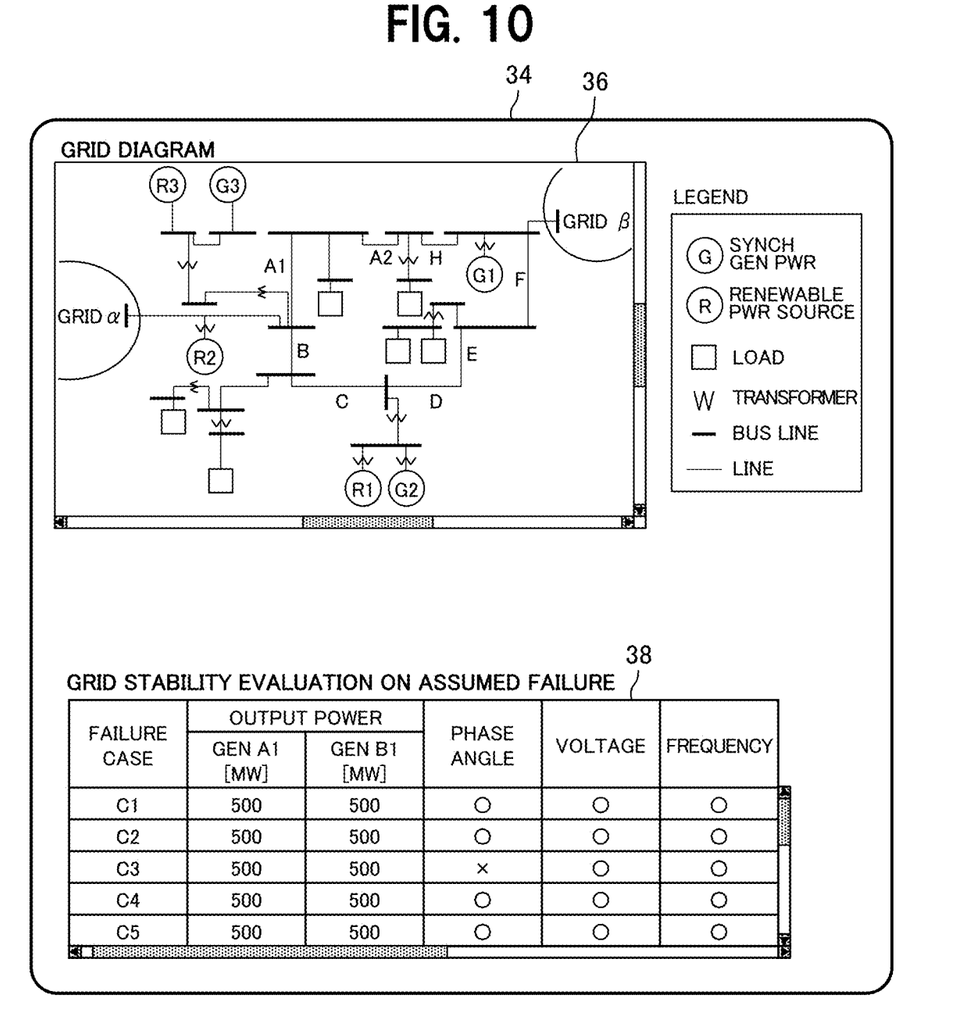
FIG. 10 is a diagram showing an example of a system stability evaluation screen displayed by a plant controller of a second embodiment.

FIG. 10 is a diagram showing an example of the grid stability evaluation screen 34 displayed by the plant controller 32 in the second embodiment.

The grid stability evaluation screen 34 includes a grid diagram display section 36 and an evaluation result display section 38. The grid diagram display section 36 displays a connection status of synchronous generators, renewable energy sources, loads, transformers, bus lines, lines, and the like.

In addition, the evaluation result display section 38 displays stability evaluation results in the power grid 80 for various assumed failures (assumed failure cases C1 to C5). Here, "failure" covers power line breaks, generator dropouts, and other power system failures.

The evaluation result display section 38 shows the output power of the generator, the phase angle of the generator, the output voltage of the generator, and the output frequency of the generator as indicators of stability when the assumed failure cases C1 to C5 occur. In the figure, "o" means stable and "x" means unstable. The example of FIG. 10 indicates that there is a problem in which the phase angle difference of the generator becomes unstable (x) when the assumed fault C3 occurs.

Figure 11:
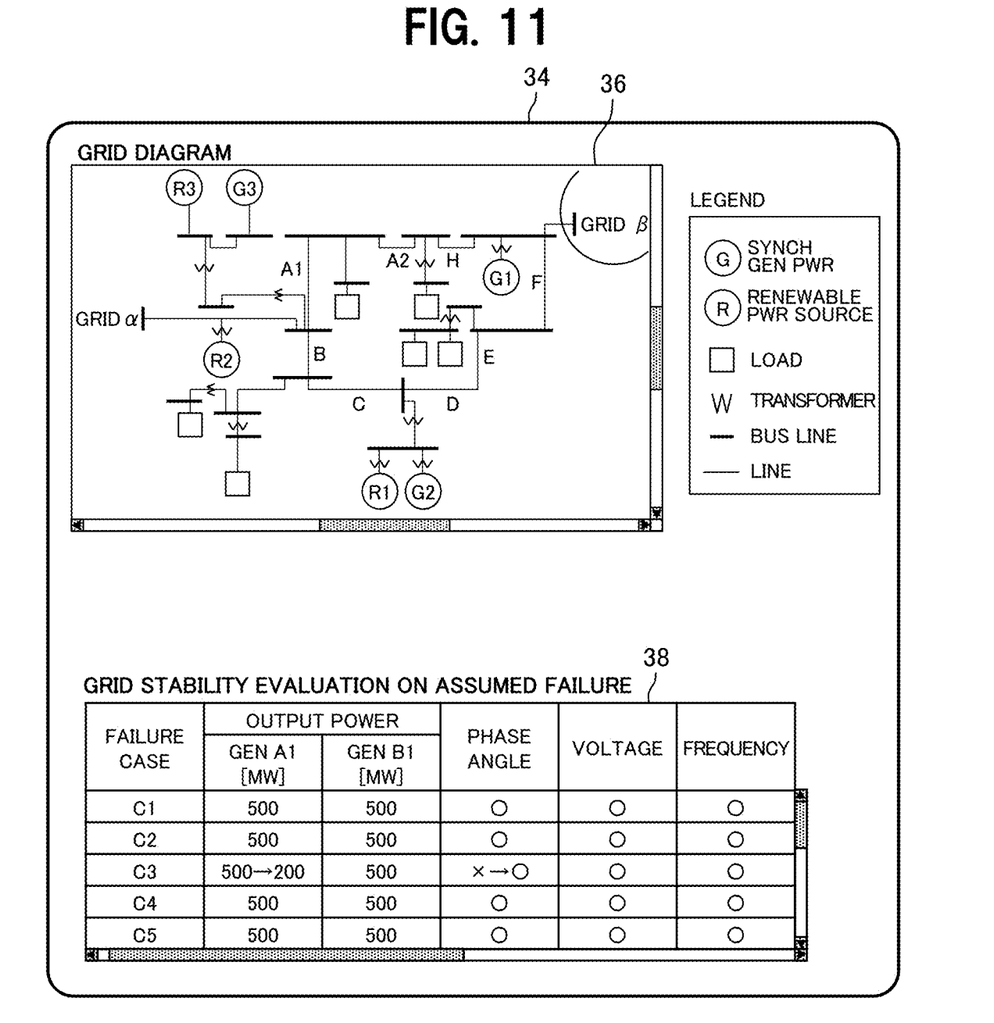
FIG. 11 is a diagram showing another example of the system stability evaluation screen.

FIG. 11 shows another example of the grid stability evaluation screen 34.

In the assumed fault C3 in the evaluation result display screen 38 in FIG. 11, it is shown that the output power P of "Generator A1" is limited from 500 [MW] to 200 [MW]. Furthermore, as a result, the phase angle difference of the generator changes from "unstable (x)" to "stable (o)," which indicates that the problem regarding the phase angle of the generator is resolved. The "500 [MW]" in FIG. 11 corresponds to the power P1H in FIG. 6, and the "200 [MW]" corresponds to the power P1L. The "P1H-P1L" is referred to as the "limitation amount $\Delta P$" of output power P.

Referring to the analysis results as described above, the control system 30 determines whether or not to output the power transmission flow limitation signal CP to the power transmission flow limiter 50, and if so, determines the amount of the output power P limitation $\Delta P$.

Third Embodiment

Next, the power system according to the third embodiment is described.

The overall configuration of the power system according to the third embodiment is the same as that of the first embodiment (see FIG. 4). It is also the same as the second embodiment in that the plant controller 32 displays the system stability evaluation screen 34 (see FIG. 10). In the following description, parts corresponding to those of the other embodiments described above are marked with the same reference signs, and their descriptions may be omitted.

In the second embodiment, the plant controller 32 determines the limitation amount $\Delta P$ of the output power P considering the stability of the power grid 80. However, if the limitation amount $\Delta P$ in the nuclear power plant 40 is too large, the output power may not be limited to the target generator output even if the amount of steam flowing from the turbine bypass valve 409 to the steam condenser 408 is maximized. In this case, a scram may be activated in the nuclear power plant 40 to prevent the generator 406 from accelerating, which may result in the shut down of the reactor 407.

To solve this problem, in the present embodiment, the upper limit value of the limitation amount ΔP determined by the plant controller 32 is calculated in advance on the basis of the opening degree of the turbine bypass valve 409. In other words, the plant controller 32 sets the upper limit value A of the limitation amount ΔP to a value according to the configuration of the nuclear power plant 40. Specifically, the upper limit value A of the limitation amount ΔP is calculated based on the following equation (1) under a definition of the upper limit value of the limitation amount ΔP as A [MW], the rated output of the generator 406 as B [MW], and the maximum throttle amount of the turbine bypass valve 409 as C [%].

$$a[\text{MW}] = B[\text{MW}] \times C[\%] \qquad \text{Equation (1)}$$

Here, it is preferable that the maximum throttle amount C is set according to the turbine bypass valve 409 installed in an existing and new nuclear power plants 40, such as, for example 33 [%] and 70 [%]. In order to secure some margin, the control system 30 may set the upper limit A to a value less than or equal to "B [MW]×C [%]".

As described above, according to the present embodiment, the limitation amount ΔP can be set within the range below or equal to the upper limit A shown in Equation (1). This allows determining the limitation amount ΔP for the output power P of the generator 406 within a range of normal operation of the nuclear power plant 40, without directly receiving signals from external systems such as the control system 30.

The state "unstable (x)" in the evaluation result display section 38 indicates that the system stability level SA (not shown) in response to various assumed failures is less than a predetermined lower limit SB (not shown). On the other hand, the state "stable (o)" indicates that the system stability level SA is above or equal to the lower limit SB. Here, if the upper limit of the system stability level SA is SC, the control system 30 sets the upper limit A of the limitation amount ΔP to satisfy "SB<SA<SC".

Here, in the examples shown in FIGS. 10 and 11, indicators of the system stability level SA includes all of the generator output power, generator phase angle, generator output voltage, and generator output frequency. However, it is not necessary to include all of these items as the system stability level SA. In other words, it is enough that at least one of the generator output power, generator phase angle, voltage, or frequency is included as an indicator of the system stability level SA.

Fourth Embodiment

Next, the fourth embodiment is described.

Figure 12:
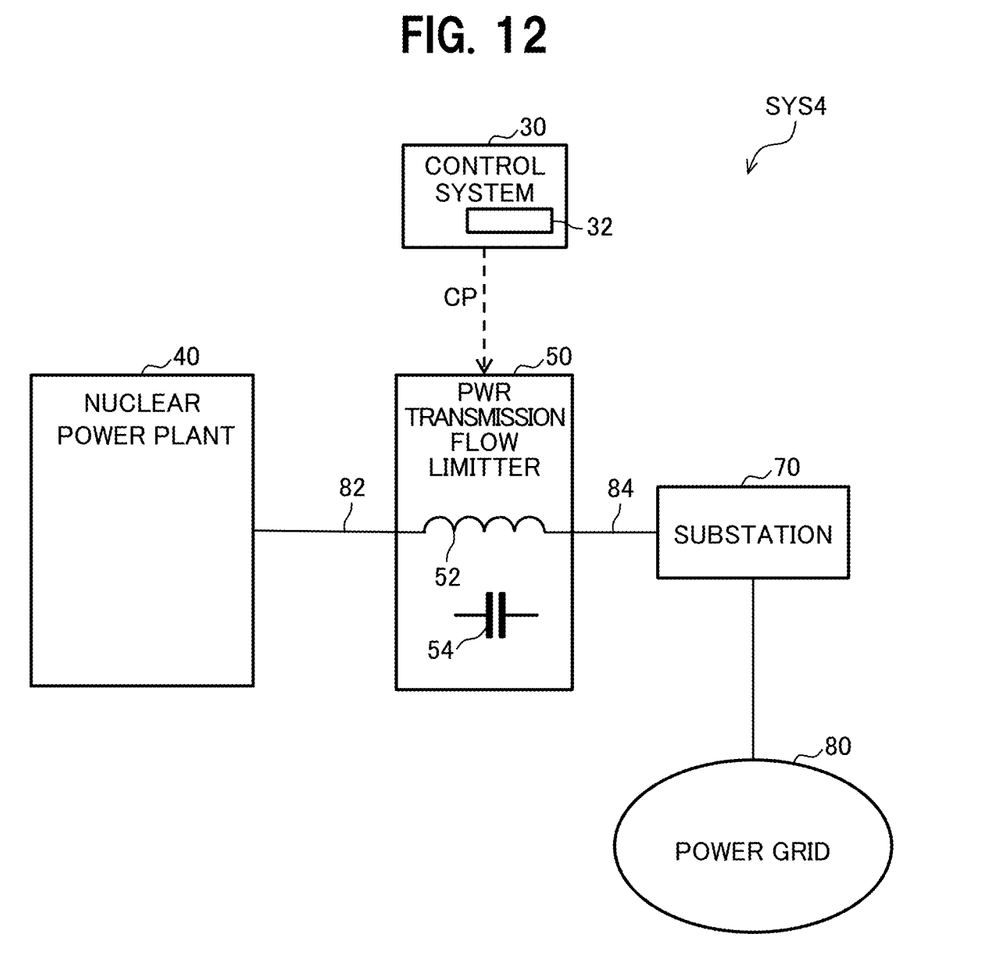
FIG. 12 is a block diagram of a power system according to a fourth embodiment.

FIG. 12 is a block diagram of the power system SYS4 according to the fourth embodiment. In the following description, parts corresponding to those of the other embodiments described above are marked with the same symbols, and their descriptions may be omitted.

Similarly to the power system SYS1 (see FIG. 4), the power system SYS4 includes a nuclear power plant 40, a substation 70, a power transmission flow limiter 50, transmission lines 82 and 84, and a control system 30. Their functions are similar to those of the first embodiment.

Note that the power transmission flow limiter 50 is equipped with a inductor 52 inserted between the transmission lines 82 and 84. Furthermore, the power transmission flow limiter 50 may be equipped with reactance such as other inductors, capacitors 54, or the like. This allows the power transmission flow limiter 50 to limit the output power P of the generator 406 based on the power transmission flow limitation signal CP, similarly to the first embodiment.

Fifth Embodiment

Next, the fifth embodiment is described.

Figure 13:
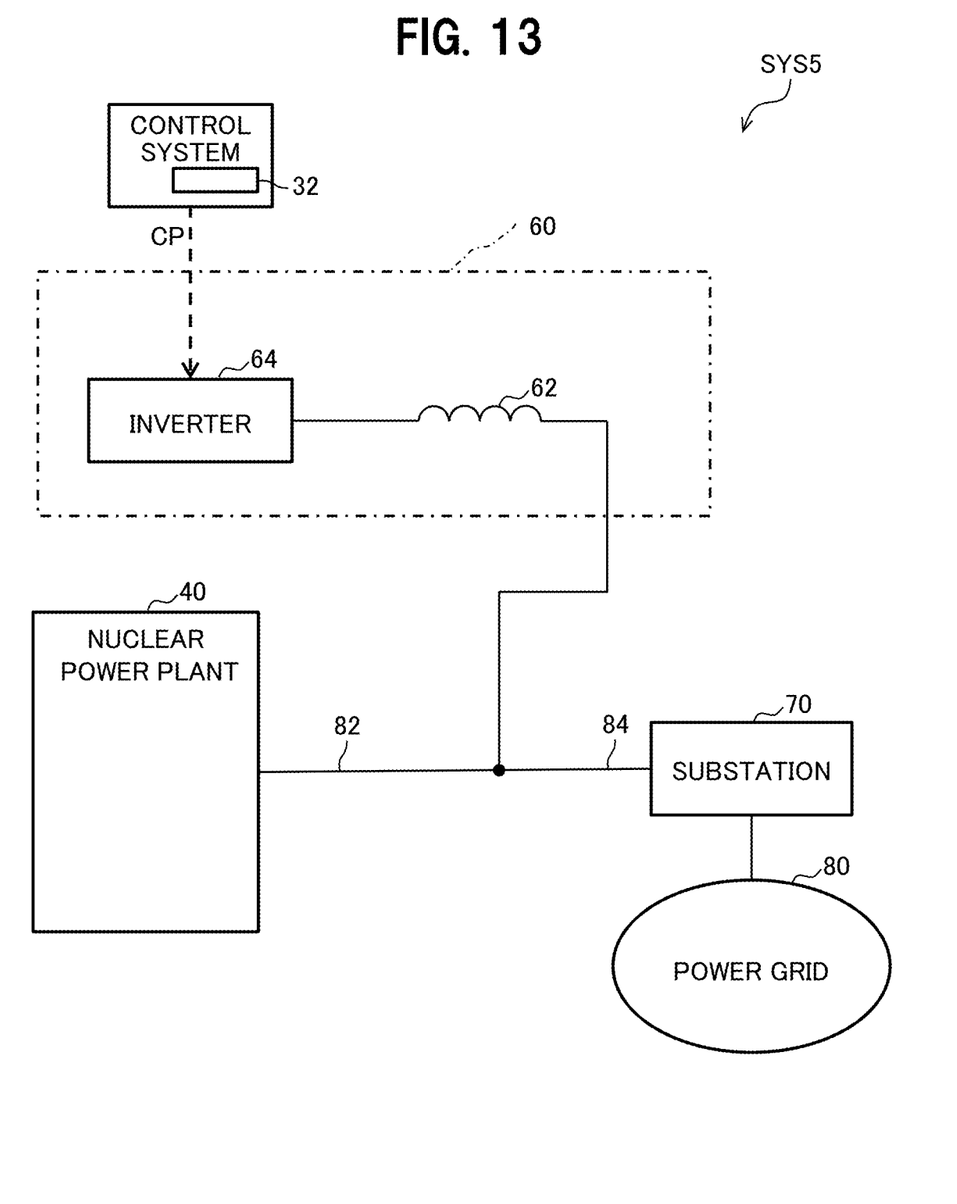
FIG. 13 is a block diagram of a power system according to a fifth embodiment.

FIG. 13 is a block diagram of the power system SYS5 according to the fifth embodiment. In the following description, parts corresponding to those of the other embodiments described above are marked with the same reference signs, and their descriptions may be omitted.

Similarly to the power system SYS1 (see FIG. 4), the power system SYS5 is equipped with a nuclear power plant 40, a substation 70, transmission lines 82 and 84, and a control system 30. These functions are similar to those of the first embodiment.

In addition, the present embodiment includes a power transmission flow limiter 60 instead of the power transmission flow limiter 50 in the first embodiment. The power transmission flow limiter 60 is equipped with an inductor 62 and an inverter 64. In the power transmission flow limiter 60, the transmission lines 82 and 84 are directly connected. Between their direct connection point and the inverter 64 is inserted the inductor 62. In other words, the inductor 62 is connected to the transmission lines 82 and 84 and used to change the transmission line voltage V.

The power transmission flow limiter 60 has a configuration similar to the STATCOM (Static Synchronous Compensator) shown in the above-mentioned non-patent literature 1. That is, the power transmission flow limiter 60 limits the output power P of the generator 406 by supplying reactive current to the transmission lines 82 and 84 in response to the power transmission flow limitation signal CP.

If the output voltage of the inverter 64 is Vi, the transmission line voltage of the transmission lines 82 and 84 is V, the reactance value of the inductor 62 is X, and a current flowing through the transmission lines 82 and 84 is I, the following equation holds.

$$V = Vi + J \times X \times I \qquad \text{Equation (2)}$$

The above equation (2) is also a commonly applicable relational equation when a capacitor (not shown) is adopted in place of the inductor 62. The equation (2) makes it possible to change the transmission line voltage V by changing the output voltage Vi of the inverter 64 and the reactance value X.

Sixth Embodiment

Next, the sixth embodiment is described.

The overall configuration of the power system according to the sixth embodiment is the same as that of the first embodiment (see FIG. 4). In the following explanation, parts corresponding to those of the first embodiment described above are marked with the same reference signs and their descriptions may be omitted.

Figure 14:
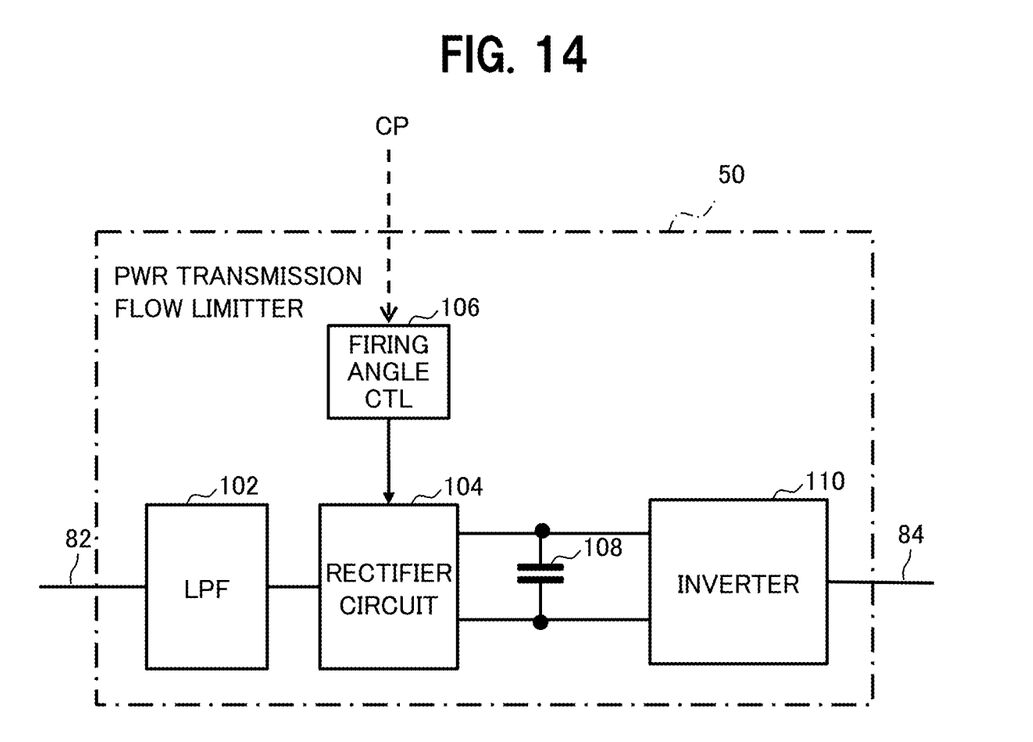
FIG. 14 is a block diagram of a power transmission flow limiter in a sixth embodiment.

FIG. 14 is a block diagram of the power transmission flow limiter 50 in the sixth embodiment.

The power transmission flow limiter 50 in the present embodiment includes a low-pass filter unit 102, a rectifier circuit 104, a firing angle controller 106, a capacitor 108, and an inverter 110.

The low-pass filter unit 102 has an inductor (not shown) connected in series with the transmission line 82 and capacitors (not shown) connected between the three phases wires of the transmission line 82. As a result, the low-pass filter unit 102 limits harmonic components of the current flowing through the transmission line 82. The rectifier circuit 104 is composed mainly of six thyristors (not shown) connected in a bridge configuration and rectifies an alternative current inputted through the low-pass filter unit 102 to charge the capacitor 108. The firing angle controller 106 controls a firing angle of the thyristors in the rectifier circuit 104 based on the power transmission flow limitation signal CP. That is, when the power transmission flow limitation signal CP is not provided, the firing angle is set to "0" degree, and as the limitation amount included in the power transmission flow limitation signal CP becomes larger, the firing angle is larger.

The larger the firing angle, the higher an impedance of the transmission flow limiter 50 as viewed from the generator 406 (see FIG. 4), so the current outputted from the generator 406 is limited. The inverter 110 modulates a terminal voltage of the capacitor 108, generates an AC voltage with the system frequency, and outputs the AC current through the transmission line 84. Such a configuration allows the transmission flow limiter 50 to limit the output power P of the generator 406 on the basis of the transmission flow limitation signal CP as in the first embodiment.

Effects of Embodiment

According to the embodiment described above, the control system 30 outputs to the power transmission flow limiter 50 a power transmission flow limitation signal CP meaning that the output power P of the power plant (40) should be limited, and the power transmission flow limiter 50 limits the output power P of the power plant (40) that is transmitted via the transmission lines 82 and 84 on the basis of the power transmission flow limitation signal CP. This allows the output power P of the power plant (40) to be controlled appropriately.

It is even more preferable if the control system 30 sets the upper limit A of the limitation amount ΔP of the output power P that is limited by the power transmission flow limitation signal CP to a value according to the configuration of the power plant (40). This allows the upper limit value A of the limitation amount ΔP to be set according to the configuration of the power plant (40), so that the output power P of the power plant (40) can be controlled more appropriately.

The substation 70 is connected to the power grid 80, and it is even more desirable if the control system 30 sets the upper limit A of the limitation amount ΔP of the output power P so that "SB<SA<SC" is satisfied, when the system stability level of the power grid 80 is indicated as SA when the output power P of the power plant (40) is limited, the lower limit of the system stability level SA as SB, the upper limit of the system stability level SA as SC. This setting allows the system stability level SA to be set to be between the lower limit SB and the upper limit SC, and the output power P of the power plant (40) to be controlled more appropriately.

In addition, it is even more desirable to include as an indicator of the system stability level SA, at least one of the phase angle of generators in the power grid 80, the voltage in the power grid 80, and the frequency in the power grid 80. This allows more appropriate control of the output power P of the power plant (40) based on appropriate indicators.

It is even more preferable if the control system 30 sets the upper limit value A of the limitation amount ΔP to "B×C" (multiplication of B and C) or less when the maximum throttle amount C of the turbine bypass valve 409 is set to C [%] and the rated output B of the power plant (40) to B. This allows the limitation amount ΔP to be set to a value that can be achieved by the turbine bypass valve 409, and the output power P of the power plant (40) can be controlled more appropriately.

In addition, it is even more preferable if the power transmission flow limiter 50 includes a inductor 52. This allows the characteristics of the inductor 52 to be utilized to control the output power P of the power plant (40) even more appropriately.

In addition, it is even more preferable if the transmission flow limiter 50 includes a capacitor 54. This allows the output power P of the power plant (40) to be controlled more appropriately by utilizing the characteristics of the capacitor 54.

Modification

The present invention is not limited to the embodiments described above, and various modifications are available. The above-described embodiments are examples to facilitate understanding and explanation of the invention and are not necessarily limited to those having all the described configurations. It is also possible to replace a part of a configuration of one embodiment with a configuration of another embodiment, and it is also possible to add a configuration of one embodiment to a configuration of another embodiment. In addition, it is also possible to delete some of configurations of each embodiment or to add or replace other configurations. In addition, control lines and information lines shown in the figures are those considered necessary for illustrative purposes and do not necessarily represent all the control lines and information lines required in the product. Actually, almost all configurations may be considered to be interconnected. Possible modifications to the above embodiments are, for example, considered as follows.

(1) Because hardware of the plant controller 32 in the above embodiment can be implemented by a general computer, a program and the like that execute various processes described above may be distributed by storing in a storage medium (computer-readable recording medium in which the program is recorded) or through a transmission channel.

(2) The various processes described above are explained as software processing using a program in the above embodiment, but some or all of them may be replaced by hardware processing using an ASIC (Application Specific Integrated Circuit) or FPGA (Field Programmable Gate Array).

REFERENCE SIGNS LIST

30: Control system
40: Nuclear power plant (power station)

50: Power transmission flow limiter
52: Inductor
54: Capacitor
70: Substation
80: Power grid
82: Power Transmission line
84: Power Transmission line
405: Turbine
406: Generator
407: Reactor (steam generator)
408: Steam condenser
409: Turbine bypass valve
A: Upper limit
B: Rated Output
C: Maximum throttle amount
P: Output power
CP: Power transmission flow limitation signal
SA: System Stability
SB: Lower limit
SC: Upper limit
ΔP: Limitation
SYS1, SYS4, SYS5: Power system

The invention claimed is:

1. A power system comprising:
a power plant including a steam condenser, a turbine, a steam generator generating steam, a turbine bypass valve that distributes the steam generated by the steam generator to the steam condenser and the turbine, and a generator driven by the turbine;
a power transmission flow limiter inserted between the power plant and a substation via transmission lines; and
a control system,
wherein
the control system outputs to the power transmission flow limiter a power transmission flow limitation signal indicating that output power of the power plant should be limited,
the power transmission flow limiter limits the output power being transmitted via the transmission line from the power plant, on a basis of the power transmission flow limitation signal, and
the control system sets an upper limit of a limitation amount of the output power limited by the power transmission flow limitation signal to a value determined based on an opening degree of the turbine bypass valve.

2. The power system according to claim 1, wherein
the substation is connected to a power grid, and
the control system sets the upper limit of the limitation amount of the output power such that a system stability level of the power grid is maintained between a lower limit and an upper limit.

3. The power system according to claim 2, wherein
an indicator of the system stability level includes at least one of a phase angle of a generator included in the power grid, a voltage in the power grid, and a frequency in the power grid.

4. The power system according to claim 1, wherein
the control system sets the upper limit of the limitation amount to a value less than or equal to a product of a maximum throttle percentage amount of the turbine bypass valve multiplied by a rated output of the power plant.

5. The power system according to claim 1, wherein
the power transmission flow limiter includes an inductor.

6. The power system according to claim 1, wherein
the power transmission flow limiter includes a capacitor.

7. A method of controlling a power system
wherein
the power system includes:
a power plant equipped with a steam condenser, a turbine, a steam generator that generates steam, a turbine bypass valve that distributes the steam generated by the steam generator to the steam condenser and the turbine, and a generator driven by the turbine;
a power transmission flow limiter inserted via transmission lines between the power plant and a substation; and
a control system, and
wherein
the method includes:
a step in which the control system outputs to the power transmission flow limiter a power transmission flow limitation signal indicating that an output power of the power plant should be limited,
a step in which the power transmission flow limiter limits the output power of the power plant transmitted through the transmission lines on a basis of the power transmission flow limitation signal,
wherein the control system sets an upper limit of a limitation amount of the output power limited by the power transmission flow limitation signal to a value determined based on an opening degree of the turbine bypass valve.

* * * * *

UNITED STATES PATENT AND TRADEMARK OFFICE
CERTIFICATE OF CORRECTION

| | | |
|---|---|---|
| PATENT NO. | : 12,476,563 B2 | Page 1 of 1 |
| APPLICATION NO. | : 18/959995 | |
| DATED | : November 18, 2025 | |
| INVENTOR(S) | : Yohei Murakami et al. | |

It is certified that error appears in the above-identified patent and that said Letters Patent is hereby corrected as shown below:

On the Title Page

Include item (30) Foreign Application Priority Data:
Dec. 15, 2023 (JP) 2023-212105

Signed and Sealed this
Twenty-seventh Day of January, 2026

John A. Squires
*Director of the United States Patent and Trademark Office*